US 9,509,447 B2

(12) United States Patent
Kim et al.

(10) Patent No.: US 9,509,447 B2
(45) Date of Patent: Nov. 29, 2016

(54) METHOD AND APPARATUS FOR IMPROVED NETWORK CODING IN WIRELESS COMMUNICATION SYSTEM

(71) Applicant: Samsung Electronics Co., Ltd, Gyeonggi-do (KR)

(72) Inventors: Suk-Won Kim, Gyeonggi-do (KR);
Jung-Soo Jung, Gyeonggi-do (KR);
Hyun-Jeong Kang, Seoul (KR);
Jung-Shin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 14/170,301

(22) Filed: Jan. 31, 2014

(65) Prior Publication Data

US 2014/0211706 A1    Jul. 31, 2014

(30) Foreign Application Priority Data

Jan. 31, 2013  (KR) ........................ 10-2013-0011216

(51) Int. Cl.
*H04W 72/04* (2009.01)
*H04L 1/00* (2006.01)
(Continued)

(52) U.S. Cl.
CPC ......... *H04L 1/0076* (2013.01); *H04B 7/15521* (2013.01); *H04L 1/0001* (2013.01);
(Continued)

(58) Field of Classification Search
CPC . H04L 1/0026; H04L 5/0053; H04L 5/0094; H04L 25/0204
USPC ........................................ 370/329, 252, 343
See application file for complete search history.

(56) References Cited

U.S. PATENT DOCUMENTS

2006/0007889 A1* 1/2006 Khan ........................... 370/331
2008/0232340 A1* 9/2008 Wan et al. ..................... 370/343
(Continued)

FOREIGN PATENT DOCUMENTS

| JP | 2006-129044 A | 5/2006 |
| KR | 10-2008-0030942 A | 4/2008 |
| WO | WO 2009/126079 A1 | 10/2009 |

OTHER PUBLICATIONS

International Search Report dated May 13, 2014 in connection with International Patent Application No. PCT/KR2014/000856, 6 pages.
(Continued)

*Primary Examiner* — Dang Ton
*Assistant Examiner* — Sai Aung (57) ABSTRACT

A method of performing a Network Coding (NC) by a transmitting node in a wireless communication system, the method comprising receiving uplink packets from a plurality of nodes through respective links, grouping the links into at least one group based on channel quality information, each group satisfying a listed range of channel quality information, performing the NC on downlink data for each group and transmitting each scheduling information shared by each group to the at least one respective group. A method of receiving network-coded data in a wireless communication system comprises transmitting an uplink packet to a transmitting node, receiving scheduling information shared by a group of links from the transmitting node, the group of links satisfying a listed range of channel quality information, receiving downlink data on which NC is performed and decoding the downlink data based on the scheduling information.

13 Claims, 10 Drawing Sheets

(51) Int. Cl.
 *H04W 72/12* (2009.01)
 *H04B 7/155* (2006.01)
 *H04L 29/08* (2006.01)
 *H04W 4/06* (2009.01)

(52) U.S. Cl.
 CPC ........ *H04W72/1289* (2013.01); *H04L 67/325* (2013.01); *H04L 2001/0093* (2013.01); *H04L 2001/0097* (2013.01); *H04W 4/06* (2013.01)

(56) References Cited

U.S. PATENT DOCUMENTS

| | | | |
|---|---|---|---|
| 2008/0267302 A1* | 10/2008 | Cai et al. | 375/260 |
| 2008/0310483 A1 | 12/2008 | Lee et al. | |
| 2009/0067533 A1* | 3/2009 | Yuan et al. | 375/267 |
| 2009/0073914 A1 | 3/2009 | Sun et al. | |
| 2009/0074089 A1* | 3/2009 | Vannithamby | 375/260 |
| 2010/0220644 A1 | 9/2010 | Reznik et al. | |
| 2011/0149807 A1* | 6/2011 | Yin et al. | 370/256 |
| 2012/0281578 A1* | 11/2012 | Hong et al. | 370/252 |
| 2014/0050187 A1* | 2/2014 | Nakshima et al. | 370/329 |
| 2014/0112277 A1* | 4/2014 | Yang et al. | 370/329 |
| 2014/0133427 A1* | 5/2014 | Kim et al. | 370/329 |
| 2014/0153515 A1* | 6/2014 | Chun et al. | 370/329 |

OTHER PUBLICATIONS

Written Opinion of the International Searching Authority dated May 13, 2014 in connection with International Patent Application No. PCT/KR2014/000856, 8 pages.

Supplementary European Search Report dated Jul. 12, 2016 in connection with European Patent Application No. EP 14 74 5997.

* cited by examiner

METHOD AND APPARATUS FOR IMPROVED NETWORK CODING IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to Korean Application Serial No. 10-2013-0011216, which was filed in the Korean Intellectual Property Office on Jan. 31, 2013, the entire content of which is hereby incorporated by reference.

TECHNICAL FIELD

The present disclosure relates to a method and an apparatus for performing an improved Network Coding (NC) in a wireless communication system.

BACKGROUND

In general, a routing method used in a multi hop-based communication system including a plurality of nodes simply stores and forwards data received by each of network nodes. Further, in order to increase throughput and reduce power consumption in data unicast/multicast of a wireless communication system, a Network Coding (NC) scheme generalizing the conventional routing method has been proposed. Specifically, when the NC is applied to each of the nodes, each of the nodes performs one of Exclusive or (XOR), addition, and multiplication on data received through a previous node and generates a network-coded packet to be output to a destination node.

Therefore, there is a need to provide an improved NC considering the deterioration of quality of data broadcasted for each of the plurality of links connected to the relay and a difference in the transmission rates of respective links.

SUMMARY

A method of performing a Network Coding (NC) by a transmitting node in a wireless communication system, the method comprising receiving uplink packets from a plurality of nodes through respective links, grouping the links into at least one group based on channel quality information, each group satisfying a listed range of channel quality information, performing the NC on downlink data for each group and transmitting each scheduling information shared by each group to the at least one respective group.

A method of receiving network-coded data in a wireless communication system comprises transmitting an uplink packet to a transmitting node, receiving scheduling information shared by a group of links from the transmitting node, the group of links satisfying a listed range of channel quality information, receiving downlink data on which network coding (NC) is performed and decoding the downlink data based on the scheduling information.

A transmitting node performing a Network Coding (NC) in a wireless communication system, the transmitting node comprising a controller configured to receive uplink packets from a plurality of nodes through respective links, group the links into at least one group based on channel quality information, each group satisfying a listed range of channel quality information, perform the NC on downlink data for each group, and transmit each scheduling information shared by each group to the at least one respective group.

A receiving apparatus for receiving network-coded data in a wireless communication system, the receiving apparatus comprising a controller configured to transmit an uplink packet to a transmitting node by a transceiver, receive scheduling information shared by a group of links from the transmitting node, the group of links satisfying a listed range of channel quality information, receive downlink data on which network coding (NC) is performed, and decode the downlink data based on the scheduling information.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Further.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. Then, terms described later are defined in consideration of the functions of the present disclosure, but may vary according to the intention or convention of a user or operator. Accordingly, the terms should be defined based on the contents over the whole present specification.

Figure 1:
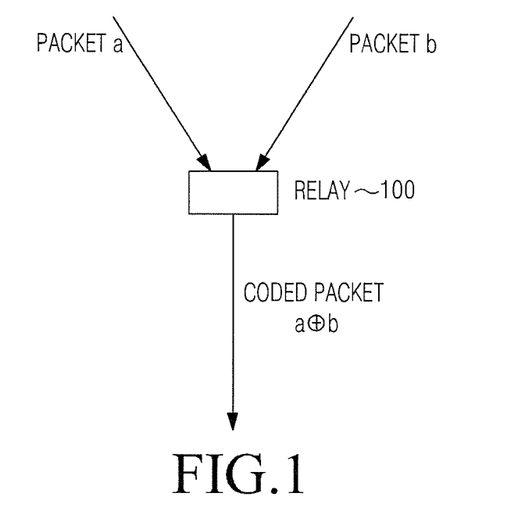
FIG. 1 illustrates an example of an NC used in a multi hop-based wireless communication system.

FIG. 1 illustrates an example of the NC used in a multi hop-based wireless communication system. The multi hop-based wireless communication system includes a cellular network and Device to Device (D2D). A relay 100 corresponds to a node located between a source node and a destination node.

Referring to FIG. 1, for example, the relay 100 receives packets a and b and outputs a network-coded packet generated by performing the NC on the packets a and b by using XOR, that is, a packet a⊕b to the destination node.

Figure 2A:
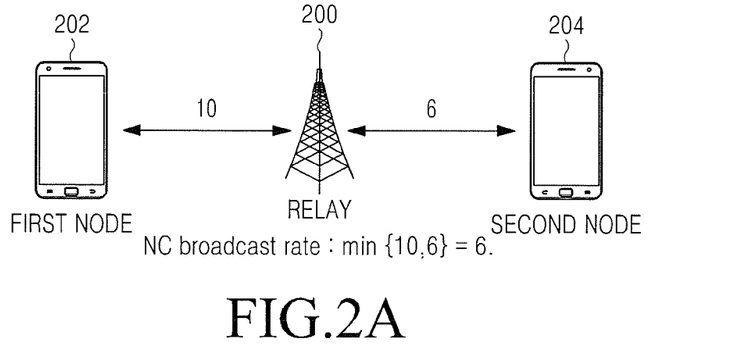
FIG. 2A illustrates an example in which a relay performs NC on a plurality of links having different channel qualities.

FIG. 2A illustrates an example in which a relay performs an NC on a plurality of links having different channel qualities. Here, a transmission rate is assumed as an example of the channel quality for each link.

Referring to FIG. 2A, for example, it is assumed that a relay 200 establishes links having transmission rates of "10" and "6" with a first node 202 and a second node 204, respectively, and are required to simultaneously broadcast packets to the first node 202 and the second node 204. Then, the relay 200 applies the smaller transmission rate of "6" between the transmission rates of the first node 202 and the second node 204 to the packet to be broadcasted and then broadcasts the packet. In this case, the problem is that the first node 202 receives a low quality packet to which a transmission rate smaller than a supported transmission rate is applied.

Meanwhile, the NC applies a maximum-retrieval scheme to reduce a number of times of transmission by transmitting a plurality of packets at a time.

Figure 2B:
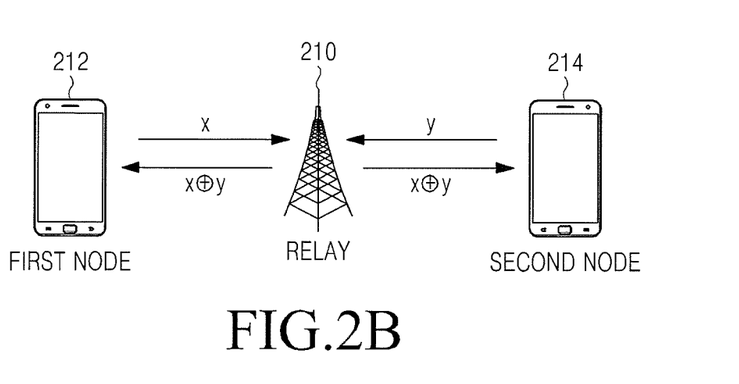
FIG. 2B illustrates an example of a delay generated when NC to which a maximum-retrieval scheme is applied is performed.

FIG. 2B illustrates an example of a delay generated when the NC to which a maximum-retrieval scheme is applied is performed.

Referring to FIG. 2B, it is assumed that a relay 210 is connected with two nodes, that is, a first node 212 and a second node 214. In this event, the relay 201 receives input packets x and y from the first node 212 and the second node 214, respectively. Thereafter, the relay 201 generates a network-coded packet x⊕y by performing XOR on the input packets x and y and broadcasts the generated packet x⊕y to each of the first node 212 and the second node 214. There is a high possibility that the input packets x and y are not received by the relay 210 at the same time due to the transmission rates of their own links and channel environments. Accordingly, the delay may occur due to a standby time until the relay 210 receives all the input packets.

Figure 3:
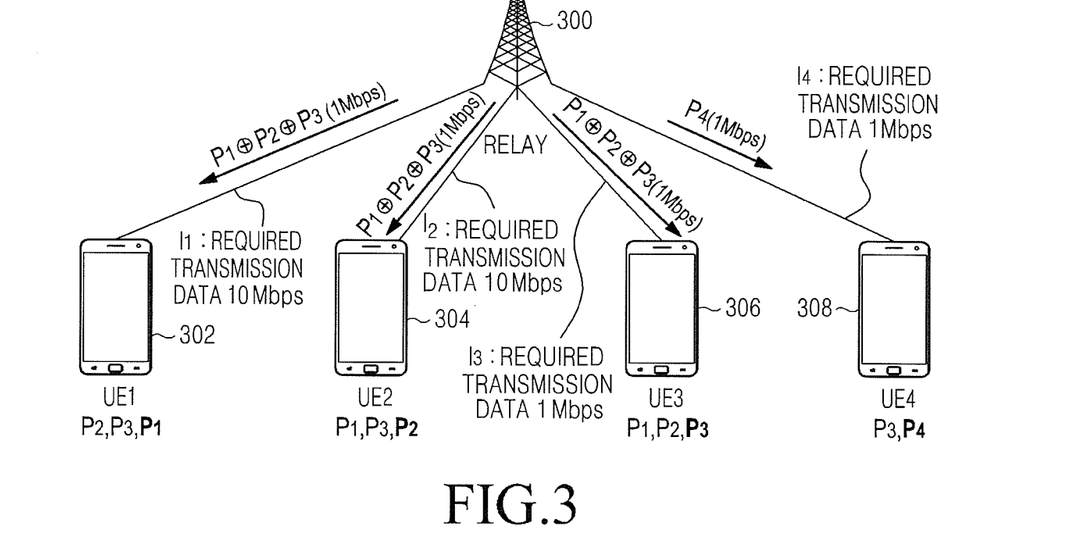
FIG. 3 illustrates an example in which NC to which a maximum-retrieval scheme is applied is performed in a multi hop-based wireless communication system.

FIG. 3 illustrates a multi hop-based wireless communication system in which NC to which a maximum-retrieval scheme is applied is performed. For convenience of a description, the relay is a node located between a source node and a destination node and a transmission rate will be described as an example of the channel quality.

Referring to FIG. 3, it is assumed that a relay 300 is connected with a total of four User Equipments (UEs) as examples of nodes, that is, UE#1 302 to UE#4 308. It is assumed that transmission rates between the relay 300 and UE#1 302 and UE#2 304 are all "10 Mbps" and transmission rates between the relay 300 and UE#3 306 and UE#4 308 are all "1 Mbps". For example, it is assumed that packets to be transmitted to the four links by the relay 300 are P1, P2, P3, and P4, respectively. In this event, a minimum value of the transmission rate of a network-coded packet $P_1 \oplus P_2 \oplus P_3$ generated by performing XOR on P1, P2, and P3 is calculated as min(10, 10, 1)=1. Accordingly, the relay 300 may satisfy demands of as many UEs as possible, that is, UE#1 302, UE#2 304, and UE#3 306 through one transmission by simultaneously broadcasting $P_1 \oplus P_2 \oplus P_3$ to UE#1 302, UE#2 304, and UE#3 306. Further, the relay 300 unicasts P4 to UE#4 308. In this event, the relay 300 reduces a number of times of transmission by simultaneously broadcasting the network-coded packet through links having largely different transmission rates, that is, the links of UE#1 302, UE#2 304, and UE#3 306. In contrast, since UE#1 302 and UE#2 304 receive the network-coded packet at 1 Mbps although they actually request a transmission rate of 10 Mbps, the required channel quality for each link deteriorates.

Accordingly, hereinafter the present disclosure suggests a link-grouping strategy, in which, when the relay performs the NC on a plurality of links connected to the relay in the multi hop-based wireless communication system, the relay groups the links having similar channel qualities among the plurality of links as one group and performs the NC on the grouped links.

Figure 4:
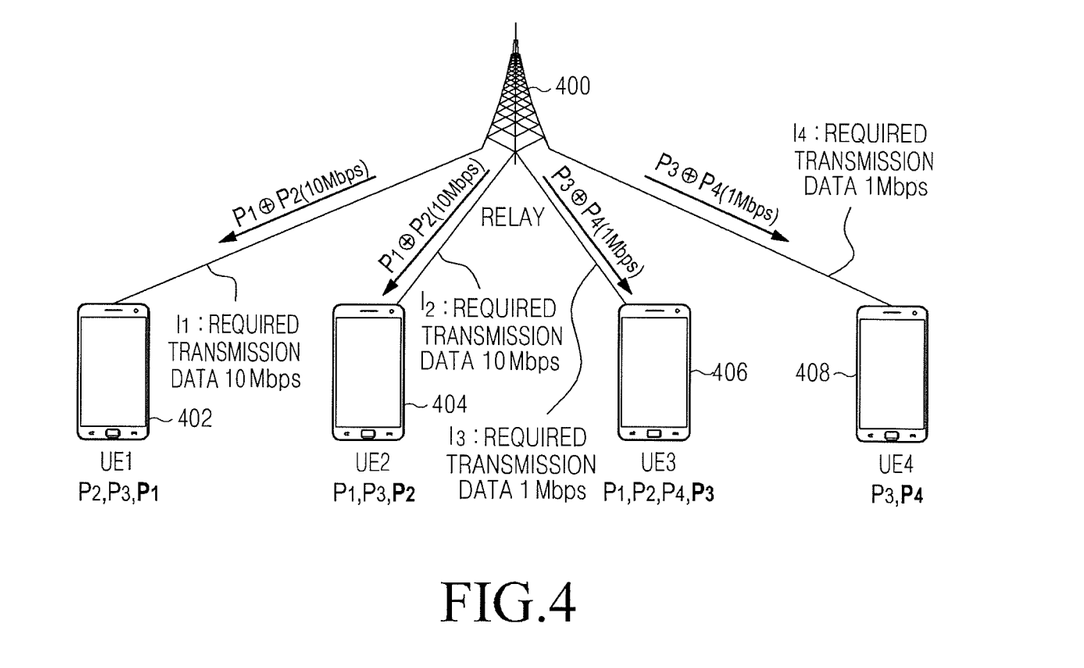
FIG. 4 illustrates an example in which an NC to which a link-grouping strategy is applied is performed according to an embodiment of the present disclosure.

FIG. 4 illustrates a multi hop-based wireless communication system in which the NC to which the link-grouping strategy is applied is performed according to an embodiment of the present disclosure.

Referring to FIG. 4, like FIG. 3, it is assumed that a relay 400 is connected with each of four UEs, that is, UE#1 to UE#4 402 to 408, a transmission rate between the relay 400 and each of UE#1 402 and UE#2 404 is "10 Mbps" and a transmission rate between the relay 400 and each of UE#3 406 and UE4 408 is "1 Mbps". Further, it is assumed that packets to be transmitted to the four links by the relay 400 are P1, P2, P3, and P4, respectively.

In this event, the relay 400 groups links having similar transmission rates among UE#1 to UE#4 402 to 408. For example, since the transmission rates of the links between the relay 400 and UE#1 402 and UE#2 404 are the same as "10 Mbps", the relay 400 groups UE#1 402 and UE#2 404 as one group, that is, a first group. Further, since the transmission rates of the links between the relay 400 and UE#3 406 and UE#4 408 are the same as "1 Mbps", the relay 400 groups UE#3 406 and UE#4 408 as one group, that is, a second group. A case where the transmission rates of the links grouped as one group are the same will be described herein as an example. However, the link-grouping strategy suggested by the present disclosure may group links having channel qualities satisfying a predetermined condition as one group among channel qualities of the links connected with the relay. The condition will be described below in more detail.

Thereafter, the relay 400 transmits a network-coded packet to UE#1 402 and UE#2 404 included in the first group and transmits a network-coded packet to UE#3 406 and UE#4 408 included in the second group. By performing the NC to which the above described link-grouping strategy is applied, the relay may simultaneously transmit data to UEs having a small difference between channel qualities. Accordingly, the NC based on the link-grouping strategy according to an embodiment of the present disclosure deteriorates the channel quality less for each link in comparison with the NC to which the maximum-retrieval scheme is applied. Further, in order to reduce a delay time generated due to reception holding of the packet input from the source node for the NC, the present disclosure pre-defines a maximum buffering time for which the UE can store the packet transmitted from the relay in a reception buffer based on Channel Quality Information (CQI) received from the UE. In addition, in an embodiment of the present disclosure, when the UE transmits the packet to the relay, the UE transmits a delay budget indicating a reception holding time of the relay for the network-coded packet to the relay. Then, the relay performs a scheduling algorithm of forwarding packets to the destination node in order starting from the smallest delay budget.

Figure 5A:
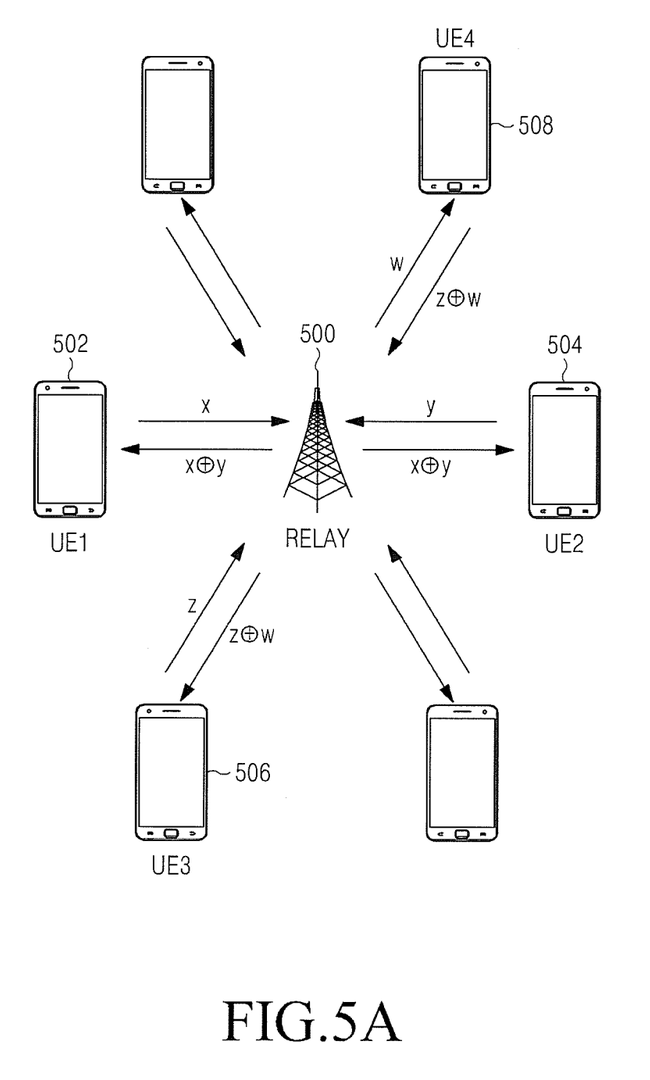
FIG. 5A illustrates an example of a configuration of a wireless communication system to which an NC according to an embodiment of the present disclosure is applied.

FIG. 5A illustrates an example of a configuration of a wireless communication system to which the NC according to an embodiment of the present disclosure is applied.

Referring to FIG. 5A, a relay 500 establishes links with a total of six UEs. Further, for example, it is assumed that the relay 500 groups UE#1 502 and UE#2 504 as the same group and UE#3 506 and UE#4 508 as the same group to perform the NC.

Figure 5B:
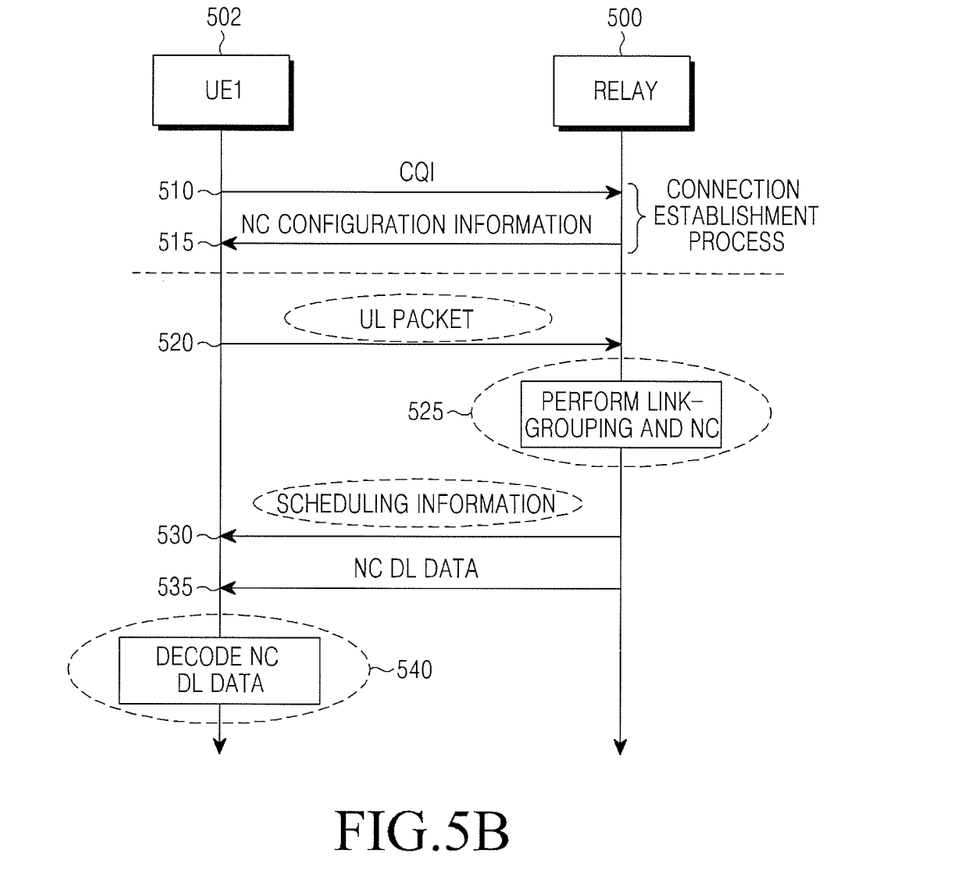
FIG. 5B is a flowchart illustrating entire operations of an NC according to an embodiment of the present disclosure in the wireless communication system of FIG. 5.

Further, FIG. 5B is a flowchart illustrating entire operations of the NC according to an embodiment of the present disclosure in the wireless communication system of FIG. 5. Although UE#1 502 is described as a representative example for convenience of a description, an operation of UE#1 502 may be performed by any UE located within a service coverage of a base station including the relay 500 in FIG. 5B.

Referring to FIG. 5B, first, the relay 500 and UE#1 502 perform a link establishment process in steps 510 to 515. That is, the relay 500 receives CQI from UE#1 502 in step 510. The CQI is similar to CQI which the UE periodically reports to a serving base station and includes information indicating whether the corresponding UE can apply the NC and information indicating whether an encoding/decoding can be performed according to an embodiment of the present disclosure. Then, in step 515, the relay 500 determines indication information of an NC scheme (for example, XOR) to be used by the relay 500 and a maximum buffering time for which the UE can store a downlink packet transmitted from the relay 500 in a reception buffer, that is, maximum buffering information based on the CQI. The downlink packet transmitted by the relay 500 includes a packet which has not been network-coded as well as a network-coded packet. Further, the relay 500 transmits NC configuration information including the indication information of the NC scheme and the maximum buffering information to UE#1 502.

As described above, when the link establishment process between UE#1 502 and the relay 500 is completed through steps 510 to 515, UE#1 502 transmits an uplink packet having a forma according to an embodiment of the present disclosure to the relay 500 in step 520.

Figure 6:
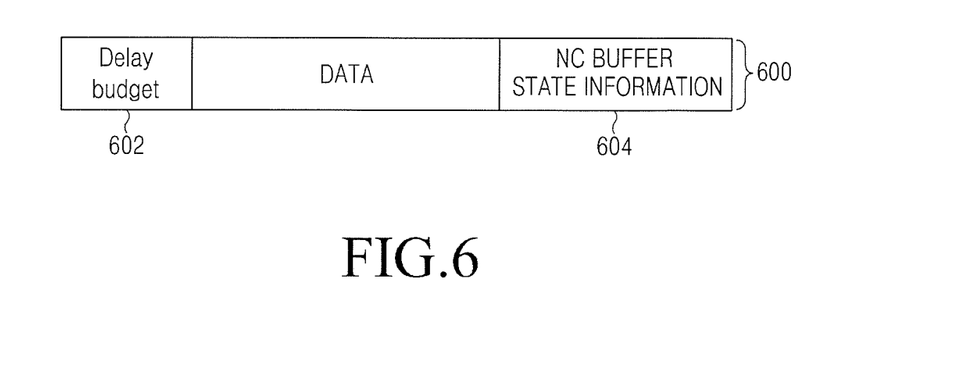
FIG. 6 illustrates an example of a format of an uplink packet according to an embodiment of the present disclosure and FIG. 7 is an operation flowchart of a relay performing an NC to which a link-grouping is applied in step 525 of FIG. 5 according to an embodiment of the present disclosure.

FIG. 6 illustrates an example of a format of an uplink packet according to an embodiment of the present disclosure.

Referring to FIG. 6, an uplink packet 600 includes a delay budget field 602 and an NC buffer state information field 604 other than a data part. As described above, the delay budget field 602 indicates a reception holding time of the relay 500 for the uplink packet 600 when UE#1 502 transmits the uplink packet 600 to the relay 500. The NC buffer state information field 604 includes information on uplink packets remaining in a transmission buffer of the UE. For example, the information on the uplink packets includes a number of uplink packets.

The relay 500 having received the uplink packet having the above format determines whether to apply the link-grouping strategy to the NC and performs the NC to which the link-grouping strategy is applied in step 525.

Figure 7:
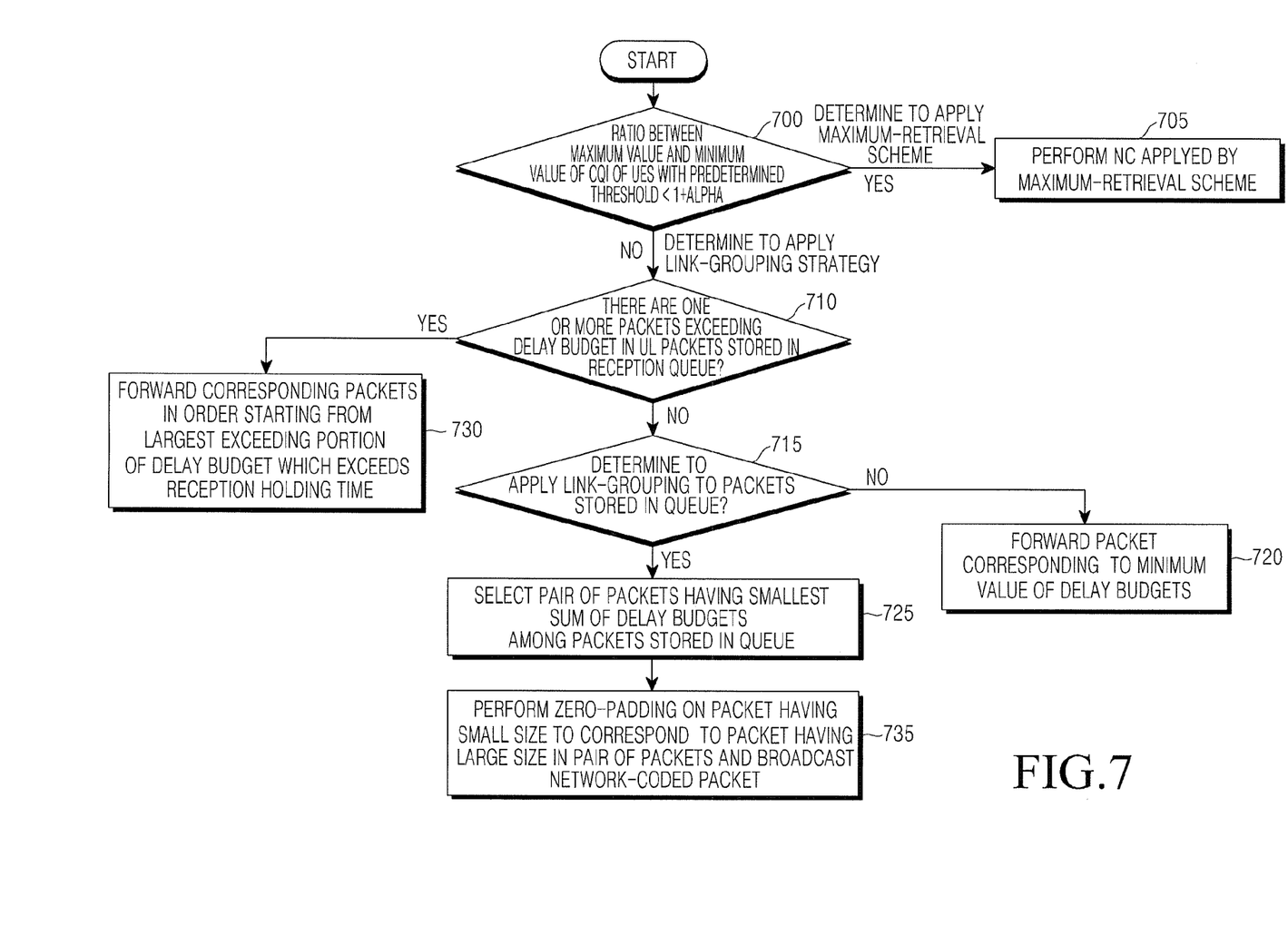

FIG. 7 is a flowchart describing operations of the relay that performs the NC to which the link-grouping strategy is applied in step 525 of FIG. 5 according to an embodiment of the present disclosure.

Referring to FIG. 7, in step 700, the relay 500 determines whether to apply the maximum-retrieval scheme or the link-grouping strategy suggested by the present disclosure based on CQI when the NC is performed. It is assumed that the relay 500 has received the CQI from UEs located within a service coverage of a base station including the relay 500. In a concrete example, it is assumed that the relay 500 uses a transmission rate as an example of CQI of each UE. Then, the relay 500 acquires a transmission data rate of the corresponding UE from the CQI. Further, the relay 500 compares a ratio between a maximum value and a minimum value of the transmission data rates of the UEs with a predetermined threshold α as shown in Equation 1 below.

$$\text{Maximum value of transmission data rate/Minimum value of transmission data rate} < 1+\alpha \qquad \text{(Equation 1)}$$

As a result of the comparison, when the ratio between the maximum value and the minimum value is smaller than $1+\alpha$, the relay 500 determines to apply the maximum-retrieval scheme and performs the NC to which the maximum-retrieval scheme is applied in step 705.

As a result of the comparison, when the ratio between the maximum value and the minimum value is larger than or equal to $1+\alpha$, the relay 500 determines to apply the link-grouping strategy suggested by the present disclosure and proceeds to step 710. In step 710, the relay 500 identifies a delay budget of each packet in a queue storing the uplink packets received from the UEs. Further, the relay 500 identifies one or more packets which exceed their own delay budgets. As a result of the identification, when there are the one or more packets exceeding their own delay budgets, the relay 500 transmits the corresponding packets to the destination node through corresponding links in order starting from the largest exceeding value of the delay budget at a present time point among the one or more packets in step 730.

As a result of the identification, when there is no packet exceeding the delay budget threshold, the relay 500 proceeds to step 715. In step 715, the relay 500 determines whether to apply the link-grouping strategy by identifying CQI of each packet which has been already received and stored in the queue by the relay 500. When there is no target to receive the application of the link-grouping, the relay 500 forwards corresponding packets to the destination node through corresponding links among the packets stored in the queue in order starting from the smallest budget value in step 720.

As a result of the determination, when there are targets to receive the application of the link-grouping, the relay 500 determines to apply the link-grouping to the packets and proceeds to step 725. In step 725, the relay 500 performs the link-grouping on the packets stored in the queue. For example, the relay 500 may select pairs of packets from the packets to receive the application of the link-grouping in order starting from a smallest sum of delay budgets. Meanwhile, when the application of the link-grouping is determined according to the embodiment of the present disclosure, a condition for grouping the links may use various types of information of the channel quality.

Figure 8:
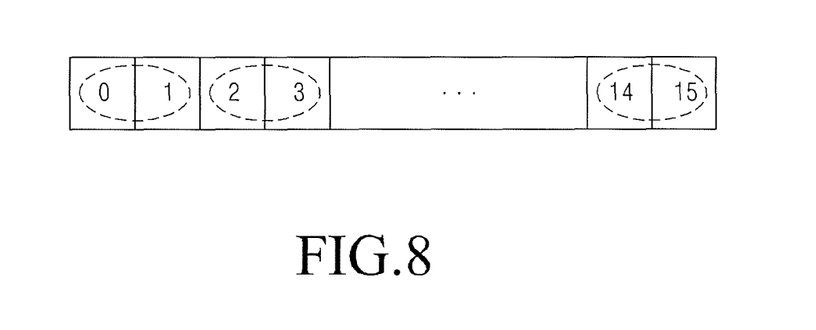
FIG. 8 is a view describing a concrete example in which a relay 500 according to an embodiment of the present disclosure performs a link-grouping in step 725 of FIG. 7.

FIG. 8 is a view describing a concrete example in which the relay 500 according to an embodiment of the present disclosure performs the link-grouping in step 725 of FIG. 7.

Referring to FIG. 8, for example, it is assumed that a total of sixteen packets are stored in the queue of the relay 500 and links through which the sixteen packets are transmitted have different CQI from 0 to 15. In this event, for example, when two packets having similar CQI are grouped as one group, a total of eight groups are created.

Meanwhile, another embodiment of the present disclosure may apply an adaptive grouping scheme of grouping CQI, which satisfies a predetermined range, as one group. In a concrete example, after a range of a grouping factor (r) is set as $0<r<1$, packets having transmission rates satisfying Equation (2) below may be grouped as one group based on a reference value c of the transmission rates.

$$1\text{group}=(1-r)c \sim (1+r)c \qquad \text{(Equation 2)}$$

For example, it is assumed that r is 0.2 and a minimum value of the transmission rate is 10 Mbps. Then, since a minimum value of the first group is 10 Mbps, c=12.5 through 10=(1−0.2)c. In this event, the first group may include links having transmission rates ranging from 10 to 12.5(1+0.2)=15 as elements. Similarly, since a second group has a minimum value of 15, c=18.75 through c(1+0.2)=15. In this event, the second group may include links having transmission rates ranging from 15 to 18.75(1+0.2)=22.5 as elements. In each of the groups grouped as described above, the links included in the same group share scheduling information and the NC is performed on the elements included in the corresponding group, so that resources can be saved.

Thereafter, in step 735, the relay 500 performs the NC on packets included in the same group with respect to each of all groups grouped according to the above described link-grouping strategy. Specifically, when the NC based on XOR is performed, the relay 500 performs a zero-padding on a packet having a small size to correspond to a packet having a large size among the packets included in the same group and broadcasts the network-coded packet to the destination node.

As described above, when the relay 500 performs the NC to which the link-grouping strategy is applied in step 525 as illustrated in FIG. 7, the relay 500 proceeds to step 530. In step 530, the relay 500 transmits the same scheduling information to UEs included in the same group with respect to all groups. Further, in step 535, the relay 500 transmits downlink data network-coded through the application of the link-grouping strategy to UE#1 502.

Figure 9:
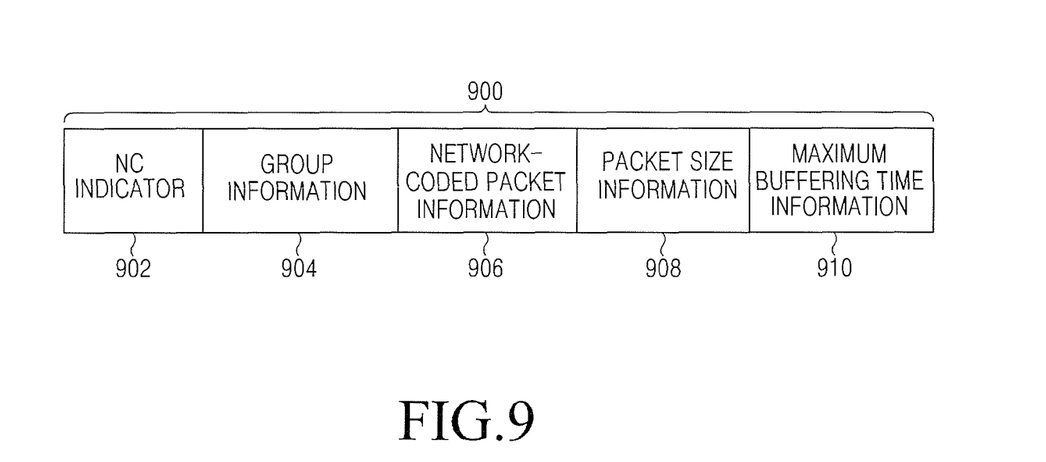
FIG. 9 is a view illustrating an example of a format of scheduling information generated when a relay determines an NC to which a link-grouping is applied according to an embodiment of the present disclosure.

FIG. 9 is a view illustrating an example of a format of scheduling information generated when the relay determines the NC to which the link-grouping is applied according to an embodiment of the present disclosure.

Referring to FIG. 9, scheduling information 900 includes an NC indicator field 902, a group information field 904, a network-coded packet information field 906, a packet size information field 908, and a maximum buffering time information field 910.

The NC indicator field 902 displays whether the maximum-retrieval scheme is applied or the link-grouping strategy is applied when the NC is performed. For example, the NC indicator field 902 may express the NC to which the maximum-retrieval scheme is applied as "1" by using one bit to indicate "1", and express the NC to which the link-grouping strategy is applied as "0" to indicate "0". Of course, the reverse thereof is possible. Further, each of the group information field 904, the network-coded packet information field 906, the packet size information field 908, and the maximum buffering time information field 910 includes corresponding information in a case where the NC indicator field 902 indicates the NC to which the link-grouping strategy is applied.

When the NC indicator field 902 indicates the NC to which the link-grouping is applied, the group information field 904 includes information indicating UEs or links included in the same group. Further, the group information field 904 includes different scrambling information allocated according to each same group. Thereafter, the UEs included in the same group may perform a decoding through the scrambling information acquired through the group information. For example, a group identifier is allocated to each same group and link identifiers included in the corresponding group may be mapped. At this time, when a number of groups is plural, the group identifiers may be listed in an order of high CQI.

The network-coded packet information field 906 is information indicating network-coded packets. For example, the information may include UE identifiers and Sequence Numbers (SNs) of packets mapped to the UE identifiers. Further, the packet size information field 908 includes information indicating a size of each of the network-coded packets. Last, the maximum buffering time information field 910 includes information indicating a maximum buffering time for which the UE can store a downlink packet transmitted from the relay in the reception buffer.

Figure 10A:
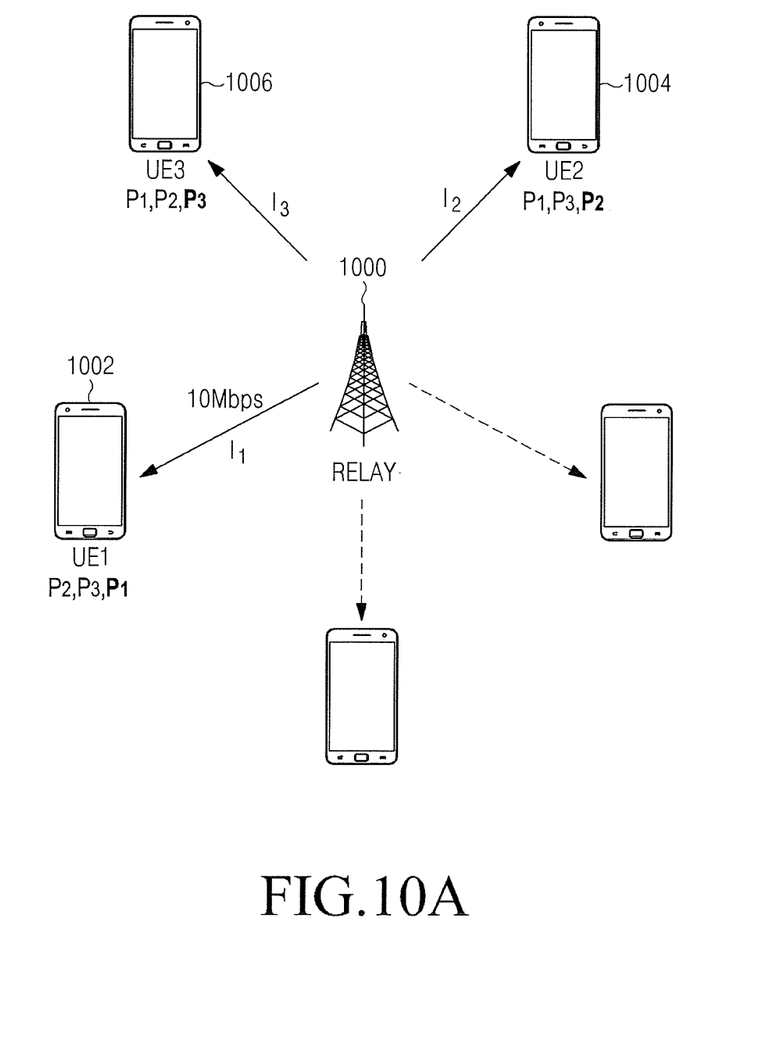
FIG. 10A is a view describing an example of operations of a receiving side of a wireless communication system in which an NC to which a link-grouping strategy is applied is performed according to an embodiment of the present disclosure.

FIG. 10A is a view describing an example of operations of a receiving side of a wireless communication system in which the NC to which the link-grouping strategy is applied is performed according to an embodiment of the present disclosure.

Referring to FIG. 10A, it is assumed that a relay 1000 receives CQI from UEs located within a service coverage of a base station including the relay 1000 and it is determined to perform the NC to which the link-grouping strategy is applied based on the received CQI. For example, UE#1 1002 to UE#3 1006 are grouped by the relay 1000 as one group since CQI satisfies a predetermined condition. Further, according to the description of FIGS. 5A and 7, each of UE#1 to UE#3 1002 to 1006 included in the group has transmitted the uplink packet and the relay 1000 has performed the NC to which the link-grouping strategy is applied. Thereafter, each of UE#1 to UE#3 1002 to 1006 included in the same group receives scheduling information and the network-coded packet from the relay 1000.

Figure 10B:
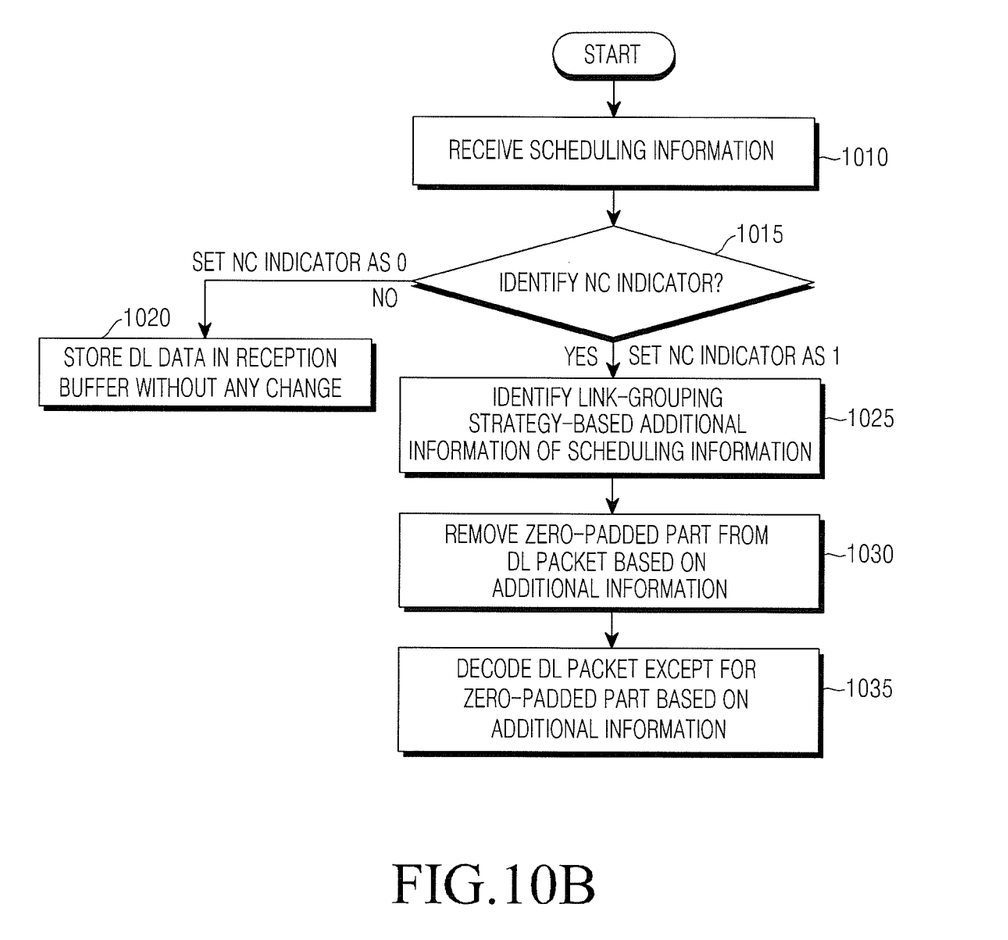
FIG. 10B is an operation flowchart of the UE according to a third embodiment of the present disclosure.

FIG. 10B is an operation flowchart of the UE according to a third embodiment of the present disclosure. For convenience of a description, an operation of UE#2 1004 will be described herein as an example of operations of UE#1 to UE#3 1002 to 1006. However, the remaining UE#1 1002 and UE#3 1006 also operate equally to UE#2 1004.

Referring to FIG. 10B, UE#2 1004 receives scheduling information from the relay 1000 in step 1010 and proceeds to step 1015. The scheduling information has been generated based on a result of the performance of the NC to which the link-grouping strategy of the relay 1000 is applied as described above.

Figure 11A:
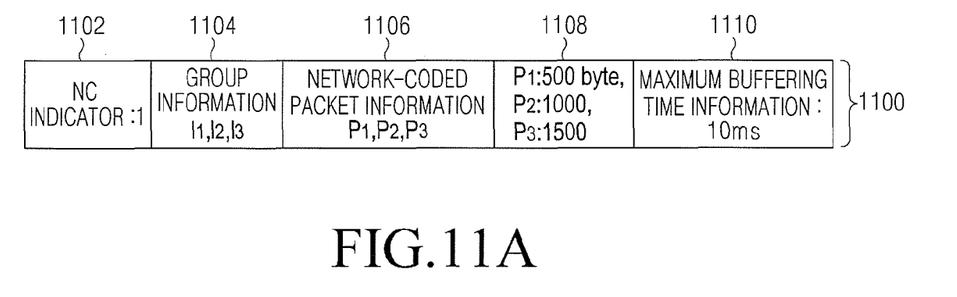
FIGS. 11A and 11B illustrate a format of scheduling information according to an embodiment of the present disclosure.
Figure 11B:
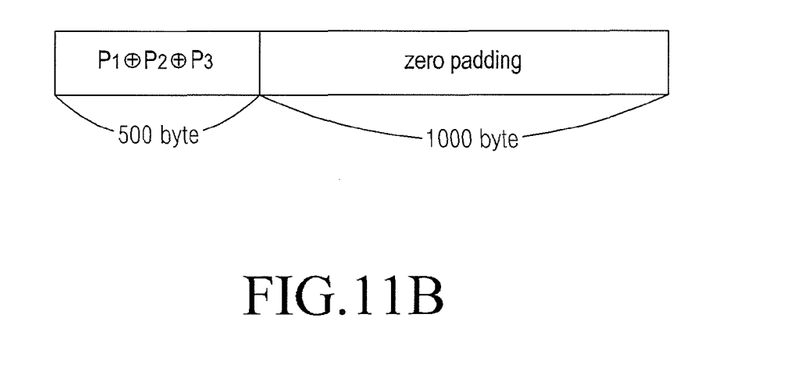

FIGS. 11A and 11B illustrate a format of scheduling information according to an embodiment of the present disclosure.

Referring to FIG. 11A, the format of the scheduling information corresponds to the format of the scheduling information in FIG. 9 and includes a detailed result of the NC to which the link-grouping strategy is applied performed by relay 1000 in FIG. 10A. First, an NC indicator field 1102 is set as "1" bit indicating that the NC to which the link-grouping strategy is applied is performed. Further, a group information field 1104 indicates links 11, 12, and 13 set between the relay 1000 and respective UE#1 1002, UE#2 1004, and UE#3 1006 included in the same group as described above. A network-coded packet information field 1106 indicates packets P1, P2, and P3 transmitted to corresponding UEs, that is, UE#1 1002, UE#2 1004, and UE#3 1006 through the links 11, 12, and 13, respectively. A packet size information field 1108 indicates size information of the packets P1, P2, and P3, that is, 500 bytes, 1000 bytes, and 1500 bytes. Last, a maximum buffering time information field 1100 indicates, for example, "10 ms".

In step 1015 of FIG. 10B, UE#2 1004 identifies the NC indicator field 1102 from the scheduling information 1100. As a result of the identification, when the NC indicator field 1102 indicates "0", that is, a case where the maximum-retrieval scheme is applied, UE#2 1004 stores data received from the relay 1000 in its own reception buffer without any change in step 1020. Although not illustrated in the drawings, the NC to which the maximum-retrieval scheme is applied is performed.

As a result of the determination, when the NC indicator field 1102 indicates "1", that is, a case where the link-grouping strategy is applied, UE#2 1004 identifies link-grouping strategy-based additional information included in the scheduling information 1100 together with the NC indicator field 1102 in step 1025. The link-grouping strategy-based additional information includes the group information field 1104, the network-coded packet information field 1106, and the packet size information field 1108, and the maximum buffering time information field 1110. In step 1030, UE#2 1004 decodes a downlink signal received from the relay 1000 as illustrated in FIG. 11B based on information acquired from the additional information. Specifically, UE#2 1004 identifies that the packet received from the packet information field 1106 of the scheduling information 1100 is P2 and a size of P2 is 1000 bytes through the packet size information field 1108. Then, UE#2 1004 removes a zero-padded part from a downlink packet received from the relay 10000. In step 1035, from the downlink packet from which the zero-padding has been excluded, UE#2 1004 acquires P2 by performing a decoding with the pre-stored packets, that is, P1 and P3, for example, by performing XOR through the use of scrambling information for each group acquired from the group information 1104.

Figure 12:
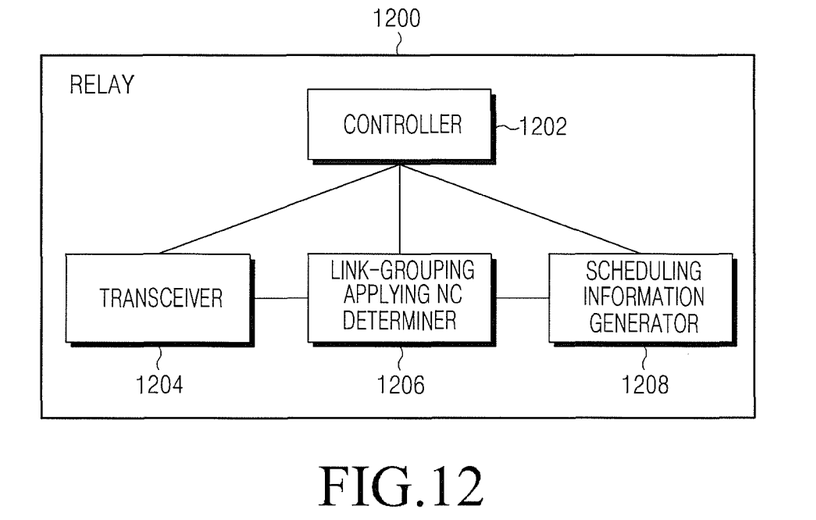
FIG. 12 is a block diagram of a relay according to an embodiment of the present disclosure.

FIG. 12 is a block diagram of the relay according to an embodiment of the present disclosure.

Referring to FIG. 12, a relay 1200 includes a controller 1202, a transceiver 1204, a link-grouping applying NC determiner 1206, and a scheduling information generator 1208.

The transceiver 1204 receives CQI information and uplink packets from UEs. The uplink packet follows the format of FIG. 6 according to the embodiment of the present disclosure.

The controller 1202 sets a maximum buffering time for which each of the UEs can store the uplink packet received from the relay 1200 in the buffer based on the CQI information received from the UEs. Further, the controller 1202 checks delay budgets of the uplink packets received from the UEs. When there are one or more uplink packets exceeding their own delay budgets in the received uplink packets, the controller 1202 forwards the uplink packets to the destination node in order starting from the uplink packet having the largest exceeding value of the delay budget at a present time point. When there is no uplink packet exceeding their own delay budget values in the received uplink packets, the controller 1202 controls the link-grouping applying NC determiner 1206 to determine whether to perform the NC to which the link-grouping strategy is applied on the uplink packets. Specifically, the link-grouping applying NC determiner 1206 identifies CQI of the uplink packets stored in the reception buffer to check whether there is a target to receive the application of the link-grouping. Specifically, concrete examples of conditions for the target to receive the application of the link-grouping include information on whether a transmission rate of each link acquired from the CQI is within a predetermined range or an order of packets having a smallest sum of delay budgets. When there is the target to receive the application of the link-grouping, the link-grouping applying NC determiner 1206 performs the NC to which the link-grouping is applied on the corresponding uplink packets. When there is no target to receive the application of the link-grouping, the link-grouping applying NC determiner 1206 determines to not perform the NC to which the link-grouping is applied. Then, the controller 1202 controls the transceiver 1204 to transmit the uplink packets stored in the reception buffer to the destination node in an order of the uplink packets having a smaller delay budget.

Meanwhile, when the controller 1202 recognizes that the link-grouping applying NC determiner 1206 determines to perform the NC to which the link-grouping is applied, the controller 1202 generates scheduling information through the scheduling information generator 1202. The scheduling information follows the format of FIG. 9 as described above. Further, the controller 1202 controls the transceiver 1204 to transmit the scheduling information and the network-coded packets to the destination node.

Figure 13:
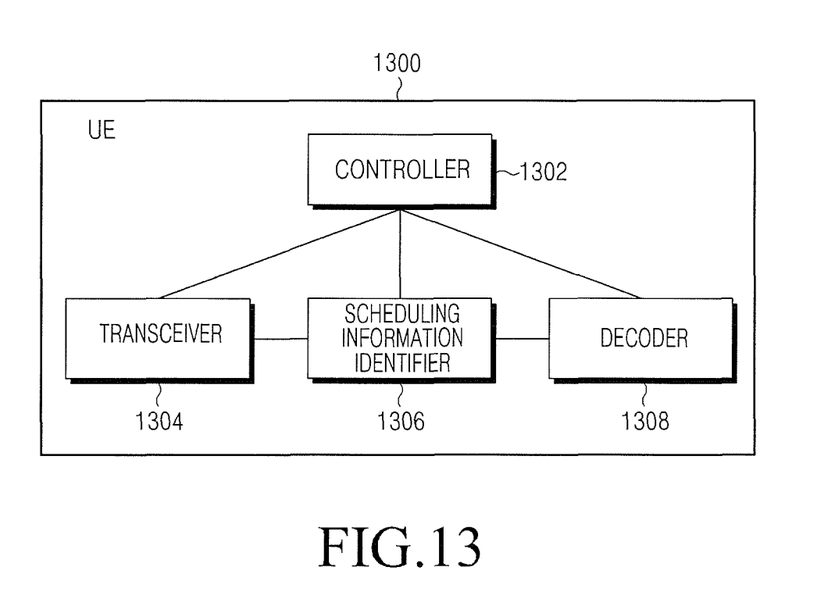
FIG. 13 is a block diagram of a UE according to an embodiment of the present disclosure.

FIG. 13 is a block diagram of the UE according to an embodiment of the present disclosure.

Referring to FIG. 13, a UE 1300 includes a controller 1302, a transceiver 1304, a scheduling information identifier 1306, and a decoder 1308.

The transceiver 1304 periodically transmits CQI to a base station through the relay or directly. Further, the transceiver transmits uplink packets including delay budgets and NC buffer state information to the destination node according to the format of FIG. 6.

The controller 1302 controls the scheduling information identifier to identify additional information in the scheduling information received from the relay. That is, the scheduling information identifier 1306 identifies whether the link-grouping strategy has been applied to the NC through the NC indicator, and identifies additional information when the link-grouping strategy has been applied to the NC. The scheduling information follows the format of FIG. 9.

Meanwhile, when the controller 1302 identifies the reception of the downlink packets, the controller 1302 distinguishes the packets included in the same group through the scheduling information and controls the decoder 1308 to decode the packets included in the same group through the scrambling information allocated to the corresponding group through the scheduling information.

As described above, by performing the NC to which the link-grouping is applied, identifying delay budgets of received packets, and scheduling downlink data in order starting from the smallest delay budget, the deterioration of channel quality of network-coded data and the transmission delay time can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting data by a relay node in a wireless communication system, the method comprising:
   receiving, from at least one user equipment (UE), an uplink packet comprising a reception holding time for network coded data and channel quality information;
   scheduling uplink packets stored in a queue based on at least one of reception holding times and the channel quality information;
   transmitting, to a target node, the scheduled uplink packets; and
   transmitting, to at least one UE, scheduling information, wherein the scheduling information includes information related to network coding;
   wherein the scheduling of the uplink packets comprises:
   if there are at least two uplink packets included in a predetermined condition among the uplink packets, performing network coding of the at least two uplink packets,
   wherein the predetermined condition is determined based on at least one of the reception holding times and the channel quality information.

2. The method of claim 1, wherein the scheduling of the uplink packets comprises:
   identifying respective budget delays for the uplink packets; and
   if there is at least one uplink packet exceeding a budget delay among the respective budget delays, determining the at least one uplink packet as one of the scheduled uplink packets.

3. The method of claim 1, wherein the scheduling of the uplink packets comprises:
   determining a pair having a minimum value of a reception holding time sum among pairs of the network coded data as the scheduled uplink packets.

4. The method of claim 1, wherein the scheduling information includes at least one of:
   an indicator indicating whether the network coding is performed;
   indication information of the network coded data;
   size information of the network coded data; or
   maximum buffering time information for which the network coded data is able to be stored in a reception buffer of the relay node.

5. A method of receiving data by a user equipment (UE) in a wireless communication system, the method comprising:
   transmitting, to a relay node, channel quality information and an uplink packet comprising a reception holding time for network coded data;
   receiving, from the relay node, scheduling information comprising information related to network coding;
   receiving, from the relay node, downlink data on which network coding is performed; and
   decoding the downlink data based on the scheduling information;
   wherein the network coding is performed based on at least one of the reception holding time and the channel quality information,
   wherein, if there are at least two uplink packets included in a predetermined condition among uplink packets, network coding of the at least two uplink packets is performed, wherein the predetermined condition is determined based on at least one of the reception holding times and the channel quality information.

6. The method of claim 5, wherein the scheduling information includes at least one of:
   an indicator indicating whether the network coding is performed;
   indication information of the network coded data;
   size information of the network coded data; or
   maximum buffering time information for which the network coded data is able to be stored in a reception buffer of the relay node.

7. A relay node for transmitting data in a wireless communication system, the relay node comprising:
   a transceiver configured to receive, from at least one user equipment (UE), an uplink packet comprising a reception holding time for network coded data and channel quality information; and
   a controller configured to perform scheduling of uplink packets stored in a queue based on at least one of reception holding times and the channel quality information;
   wherein the transceiver is configured to transmit, to a target node, the scheduled uplink packets and to transmit, to at least one UE, scheduling information; and
   wherein the scheduling information includes information related to network coding,
   wherein the controller is further configured to, if there are at least two uplink packets included in a predetermined condition among the uplink packets, perform network coding of the at least two uplink packets, wherein the predetermined condition is determined based on at least one of the reception holding times and the channel quality information.

8. The relay node of claim 7, wherein the controller is configured to identify respective budget delays for the uplink packets and, if there is at least one uplink packet exceeding a budget delay among the respective budget delays, determine the at least one uplink packet as one of the scheduled uplink packets.

9. The relay node of claim 7, wherein the controller is configured to perform network coding on at least two uplink packets if there are at least two uplink packets included in a predetermined condition among the uplink packets; and
   wherein the predetermined condition is determined based on at least one of the reception holding times and the channel quality information.

10. The relay node of claim 9, wherein the controller is configured to determine a pair having a minimum value of a reception holding time sum among pairs within the network coded data as the scheduled uplink packets.

11. The relay node of claim 7, wherein the scheduling information includes at least one of:
    an indicator indicating whether the network coding is performed;
    indication information of the network coded data;
    size information of the network coded data; or
    maximum buffering time information for which the network coded data is able to be stored in a reception buffer of the relay node.

12. A user equipment (UE) for receiving data in a wireless communication system, the UE comprising:
- a transceiver configured to transmit, to a relay node, channel quality information and an uplink packet comprising a reception holding time of network coded data, the transceiver also configured to receive, from the relay node, scheduling information comprising information related to network coding and downlink data on which network coding is performed; and
- a controller configured to decode the downlink data based on the scheduling information,
- wherein the network coding is performed based on at least one of the reception holding time and the channel quality information,
- wherein the controller is further configured to, if there are at least two uplink packets included in a predetermined condition among the uplink packets, perform network coding of the at least two uplink packets, wherein the predetermined condition is determined based on at least one of the reception holding times and the channel quality information.

13. The UE of claim 12, wherein the scheduling information includes at least one of:
- an indicator indicating whether the network coding is performed;
- indication information of the network coded data;
- size information of the network coded data; or
- maximum buffering time information for which the network coded data is able to be stored in a reception buffer of the relay node.

* * * * *